J. W. CALKINS.
MACHINES FOR SAWING LATH.
No. 186,795. Patented Jan. 30, 1877.
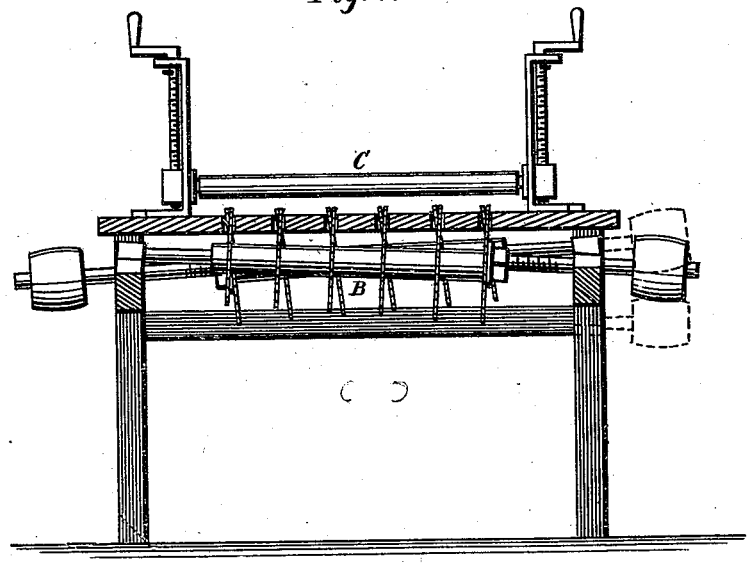
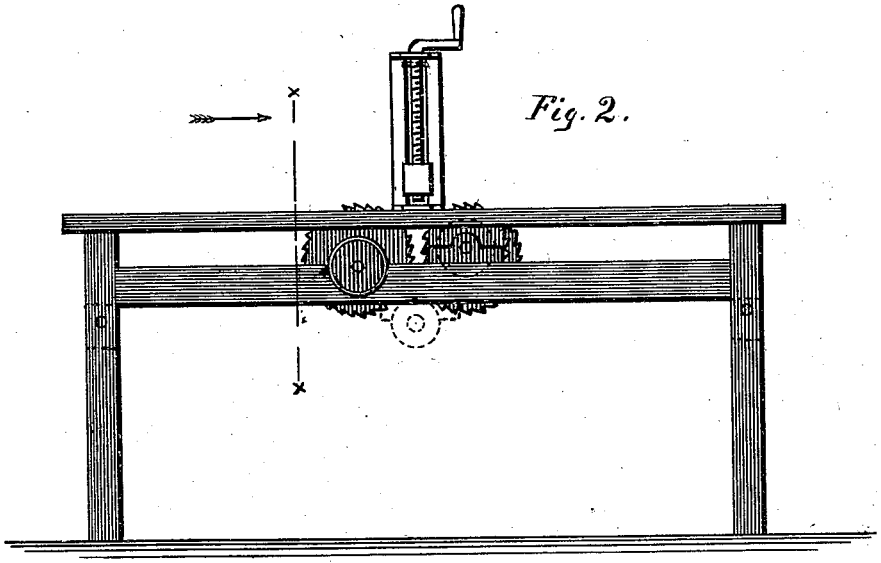

UNITED STATES PATENT OFFICE.

JOHN W. CALKINS, OF AVOCA, NEW YORK.

IMPROVEMENT IN MACHINES FOR SAWING LATHS.

Specification forming part of Letters Patent No. 186,795, dated January 30, 1877; application filed November 18, 1876.

*To all whom it may concern:*

Be it known that I, JOHN W. CALKINS, of Avoca, in the county of Steuben and State of New York, have invented a new and valuable Improvement in Machines for Sawing Laths; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my lath-machine as shown in transverse section taken in line $x$ $x$ of Fig. 2. Fig. 2 is a side elevation of my machine. Fig. 3 is an end view of a board of lath as produced by my machine.

This invention relates to machines for preparing laths for buildings; and it consists, mainly, in two or more gangs of circular saws running beneath the same table, in combination with a pressure-roller, for the purpose of cutting longitudinal dovetail grooves in boards, which I use in place of ordinary lath for securing the wall-plaster, as will be hereinafter more fully described.

Fig. 1 of the accompanying drawings is a sectional view taken in the line $x$ $x$ of Fig. 2, which is a side elevation of my lath-machine. The saws are placed on the arbor with interposing collars or thimbles of the required thickness or length, and secured by a nut after the last saw is put on in the usual way of securing single saws. I generally use two such gangs of saws mounted separately, the arbors of which are placed at angles, or crossing each other on a line directly under the middle of the working-table, as shown at B, Fig. 1. The saws project above the table sufficiently to make the depth of groove required as the board is passed along over them. As the arbors are set at an angle with the plane of the table, in order to have the saws project equally above its working-surface, the saws in each gang are of different diameters, and graded to a line parallel with the upper surface or plane of the table. One gang of inclined saws is placed sufficiently in advance of the other to prevent interference, and an additional or intermediate horizontal gang of clearing-saws may or may not be used, as is deemed best for the work.

The table of the machine is made adjustable by any suitable device, to give the grooves the depth required.

The pulleys for driving the two gangs of saws may be placed one on each side, or both on the same side of the table, with an intermediate tightening-pulley, as the situation of the driving-power demands.

A board of the required thickness and width being placed on the table, the presser-roller C is brought down to the proper distance to admit of an easy passing of the board between it and the table while the grooving is being done. When it is passed through the under side will have the appearance shown at D in Fig. 3, which is an end view of a board as finished. It will be seen that the grooves cut by this arrangement of saws are dovetail grooves, into which the plaster is to be forced during the process of laying on the wall.

The article produced by this kind of machine remains in the form of boards, say a foot wide, and of any length required. Left in this form such lath has the advantage of being put on more rapidly, and at the same time of making building-walls far more firm, when nailed on in the manner of sheathing, than any frame or wall can be when covered by single-strip laths, as each nail in the latter case becomes a pivot, and to a certain extent permitting a slight motion, or a giving in the plane of the wall. It is also positively economical in the use of the plaster applied, for it cannot be forced through and lost between the studdings, as is done when the single-strip lath is used.

Having described my invention, and the operation of my machine, what I claim as new, and desire to secure by Letters Patent, is—

The pressure-roller C, in combination with the graded saws of different diameters, journaled on oppositely-inclined axes, as above described, said pressure-roller being placed immediately over the horizontal table, and between the two gangs of saws, and raised and lowered by hand-screws, or suitable mechanism, substantially as described.

In testimony that I claim the above I have hereunto subscribed my name in the presence of two witnesses.

JOHN W. CALKINS.

Witnesses:
N. B. CHASE.
J. F. SHERVER.